United States Patent
Hate (10) Patent No.: US 10,057,182 B2
(45) Date of Patent: Aug. 21, 2018

(54) METHOD FOR PROVIDING DEVELOPMENT AND DEPLOYMENT SERVICES USING A CLOUD-BASED PLATFORM AND DEVICES THEREOF

(71) Applicant: Infosys Limited, Bangalore (IN)

(72) Inventor: Sudhanshu Hate, Pune (IN)

(73) Assignee: Infosys Limited, Bangalore (IN)

( * ) Notice: Subject to any disclaimer, the term of this patent is extended or adjusted under 35 U.S.C. 154(b) by 234 days.

(21) Appl. No.: 13/889,131

(22) Filed: May 7, 2013

(65) Prior Publication Data
US 2013/0297803 A1    Nov. 7, 2013

(30) Foreign Application Priority Data
May 7, 2012 (IN) .......................... 1760/CHE/2012

(51) Int. Cl.
*H04L 12/24* (2006.01)
*H04L 12/917* (2013.01)
*G06F 8/60* (2018.01)

(52) U.S. Cl.
CPC ............. *H04L 47/76* (2013.01); *G06F 8/60* (2013.01)

(58) Field of Classification Search
CPC ........ G06F 8/20; G06F 17/30607; G06F 8/00; G06F 9/465; G06F 11/3409
See application file for complete search history.

(56) References Cited

U.S. PATENT DOCUMENTS

| | | | |
|---|---|---|---|
| 7,403,901 B1 * | 7/2008 | Carley | G06F 17/30306 379/111 |
| 7,596,620 B1 | 9/2009 | Colton et al. | |
| 2003/0106039 A1 * | 6/2003 | Rosnow | G06Q 10/06 717/100 |
| 2004/0073673 A1 * | 4/2004 | Santos | H04L 29/06 709/226 |
| 2006/0075070 A1 * | 4/2006 | Merissert-Coffinieres | G06F 8/00 709/218 |
| 2007/0100903 A1 * | 5/2007 | Cherry | G06F 8/71 |
| 2008/0295075 A1 * | 11/2008 | Janson | G06F 11/3604 717/120 |

(Continued)

OTHER PUBLICATIONS

Savvis Inc., "Enterprise Cloud Computing," retrieved from, <http://www.savvis.com/en-us/infastructure-services/enterprise-cloud/pages/home.aspx>, on Apr. 24, 2012, pp. 1.

(Continued)

*Primary Examiner* — Moustafa M Meky
*Assistant Examiner* — Elizabeth Kassa
(74) *Attorney, Agent, or Firm* — LeClairRyan PLLC (57) ABSTRACT

A method, non-transitory computer readable medium, and platform management device for providing computer program development and deployment in a platform. A plurality of input parameters related to a development and deployment project are received. A plurality of development and deployment resources are determined based on the plurality of input parameters. The plurality of required development and deployment resources are provisioned. An execution environment is provided for utilization of the development and deployment resources. A plurality of supporting processes are provided to support the utilization of the execution environment.

24 Claims, 5 Drawing Sheets

(56) References Cited

U.S. PATENT DOCUMENTS

| | | | | |
|---|---|---|---|---|
| 2009/0300423 | A1* | 12/2009 | Ferris | G06F 11/36 714/38.1 |
| 2010/0281475 | A1* | 11/2010 | Jain | G06F 8/68 717/172 |
| 2011/0055707 | A1* | 3/2011 | Kimmet | G06F 8/61 715/735 |
| 2011/0265164 | A1* | 10/2011 | Lucovsky et al. | 726/7 |
| 2011/0295998 | A1* | 12/2011 | Ferris et al. | 709/224 |
| 2011/0296386 | A1* | 12/2011 | Woollen | G06F 8/70 717/124 |
| 2013/0073614 | A1* | 3/2013 | Shine | G06F 8/70 709/203 |
| 2013/0073713 | A1* | 3/2013 | Netto | G06F 9/5011 709/224 |
| 2013/0152047 | A1* | 6/2013 | Moorthi | G06F 11/368 717/124 |
| 2013/0232463 | A1* | 9/2013 | Nagaraja et al. | 717/101 |
| 2013/0232498 | A1* | 9/2013 | Mangtani | G06F 9/5072 718/104 |
| 2014/0157262 | A1* | 6/2014 | Hicks | G06F 9/45537 718/1 |

OTHER PUBLICATIONS

Naghshineh et al., "IBM Research Division Cloud Computing Initiative," IBM Journal of Research and Development 53(4):1:1-1:10 (2009).

Savvis, Inc., "Accelerating Time to Market: Application Development and Test in the Cloud," retrieved from http://www.clouds.savvis.com/downloads/whitepapers_survey_reports/Accelerating_Time_To_Market_WP.pdf on May 7, 2013.

Mandalia, R., "Cloud Based Platform From IBM Helps Improve Software Development Skills," retrieved from http://www.itproportal.com/2011/06/08/cloud-based-platform-from-ibm-helps-improve-software-development-skills/ on Apr. 24, 2012.

Riungu, L., "Research Issues for Software Testing in the Cloud," 2nd IEEE International Conference on Cloud Computing Technology and Science, pp. 557-564 (2010).

* cited by examiner

METHOD FOR PROVIDING DEVELOPMENT AND DEPLOYMENT SERVICES USING A CLOUD-BASED PLATFORM AND DEVICES THEREOF

This application claims the benefit of Indian Patent Application Filing No. 1760/CHE/2012, filed May 7, 2012, which is hereby incorporated by reference in its entirety.

FIELD

This technology relates to methods for providing development and deployment services in a cloud-based platform and devices thereof.

BACKGROUND

The life cycle of a computer program includes two key phases, development and deployment. Currently, complete application development is performed on premise within an enterprise or organization. On premise application development requires up front capital investments, including procuring the necessary hardware and software for the development environment, obtaining the necessary licenses, as well as creating the required development and maintenance processes, such as project tracking, quality assessment, and people management. No turnkey approach is available for provisioning application development and deployment, i.e., the entire computer program life cycle, off premise in a platform.

Cloud computing currently provides for off premise computer program deployment on the cloud. Cloud computing relates to the delivery of computing as a service rather than a product, whereby resources, computer programs, and information are provided to computers and other devices as a utility over a network. Additionally, cloud computing provides computation, computer programs, data access and management, and storage resources without requiring cloud users to know the location and other details of the computing infrastructure.

Industry standard cloud models such as Infrastructure as a Service (IaaS), Platform as a Service (PaaS), and Software as a Service (SaaS) support only finished application hosting. None of the existing cloud models supports the entire computer program life cycle, i.e., real-time computer program development and deployment on the cloud.

SUMMARY

A method for providing development and deployment services in a platform by receiving by a platform management computing device a plurality of input parameters related to a development and deployment project. A plurality of development and deployment resources for the development and deployment project are determined by the platform management computing device based on the plurality of input parameters. The plurality of development and deployment resources are provisioned by the platform management computing device. An execution environment is provided by the platform management computing device for utilization of the development and deployment resources. A plurality of supporting processes are provided by the platform management computing device to support the utilization of the execution environment.

A non-transitory computer readable medium having stored thereon instructions for providing development and deployment services in a platform by receiving a plurality of input parameters related to a development and deployment project. A plurality of development and deployment resources for the development and deployment project are determined based on the plurality of input parameters. The plurality of development and deployment resources are provisioned. An execution environment is provided for utilization of the development and deployment resources. A plurality of supporting processes are provided to support the utilization of the execution environment.

A platform management computing device comprising a memory coupled to one or more processors which are configured to execute programmed instructions stored in the memory including receiving a plurality of input parameters related to a development and deployment project. A plurality of development and deployment resources for the development and deployment project are determined based on the plurality of input parameters. The plurality of development and deployment resources are provisioned. An execution environment is provided for utilization of the development and deployment resources. A plurality of supporting processes are provided to support the utilization of the execution environment.

This technology provides a number of advantages including providing more effective methods, non-transitory computer readable medium and devices for providing development and deployment services in a platform. This technology allows for planning and provisioning of an environment for real-time development and deployment of a computer program on a cloud-based platform. This technology facilitates the real-time development and deployment of a computer program during the entire life-cycle of the computer program development and deployment from remote locations without the need to incur large upfront capital costs for the project.

DETAILED DESCRIPTION

Figure 1:
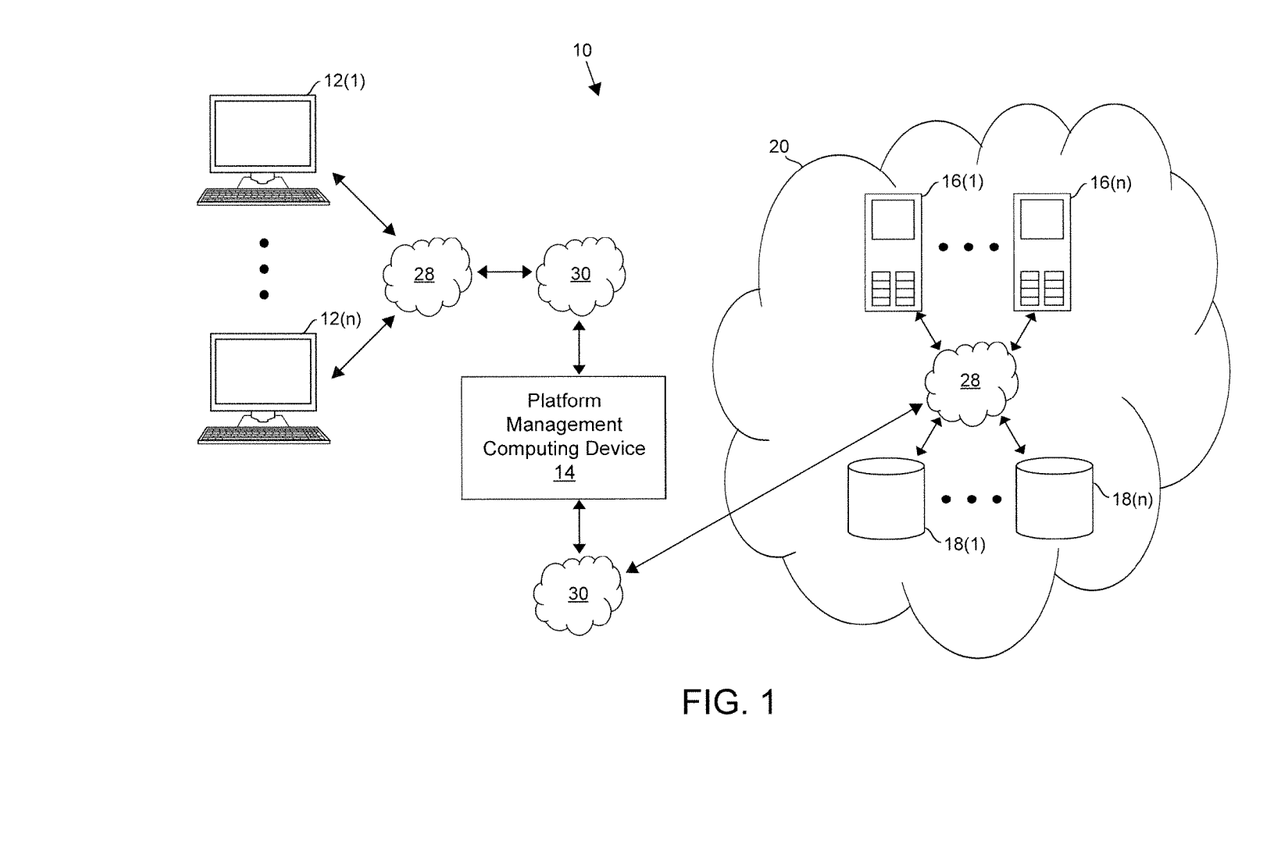
FIG. 1 is a block diagram of an exemplary network environment which includes an exemplary platform management computing device for providing end to end real-time development and deployment services in a single platform.
Figure 2:
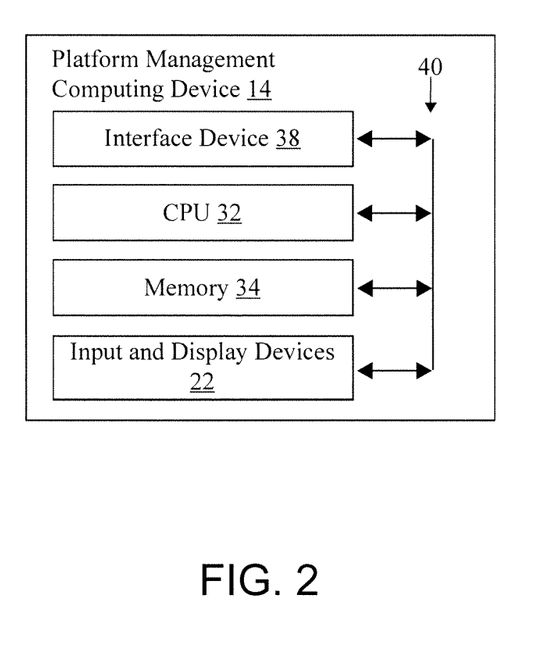
FIG. 2 is an illustration of the exemplary platform management computing device.

An exemplary cloud computing environment 10 with a platform management computing device 14 is illustrated in FIGS. 1-2. The cloud computing environment 10 includes one or more client computing devices 12(1)-12(n), the platform management computing device 14, a plurality of server computing devices 16(1)-16(n), a plurality of storage devices 18(1)-18(n) clustered within a network cloud 20, and a communication network comprising a Local Area Network (LAN) 28 and a Wide Area Network (WAN) 30, although the environment could include other types and numbers of systems, devices, components and other elements in other configurations. This technology provides a number of advantages including providing more effective methods, non-transitory computer readable medium and devices for providing development and deployment services in a platform.

Referring more specifically to FIG. 1, in this example the cloud computing environment 10 offers services to client computing devices 12(1)-12(n) outside of the cloud 20, such as web services or the provision of software, platforms, infrastructure and/or storage as services, although other types and numbers of services could be offered. Additionally, in this example the platform management computing device 14 is configured to receive inbound service requests from a web browser or other application running on client computing devices 12(1)-12(n), although the platform management computing device 14 could receive other types of requests from other sources. The platform management computing device 14 also sends corresponding outbound service requests to corresponding applications run on one or more of the plurality of server computing devices 16(1)-16(n) and/or on the plurality of memory storage devices 18(1)-18(n) within the cloud 20, although the requests could be sent to other types of systems and devices to be serviced. The platform management computing device 14 dynamically can provision the transmission of these service requests based on the load on each of the plurality of server computing devices 16(1)-16(n) and/or on the plurality of memory storage devices 18(1)-18(n) within the cloud 20, although other manners for provisioning services could be used. Further, the platform management computing device 14 receives the responses to these service requests from one or more of the plurality of server computing devices 16(1)-16(n) and/or on the plurality of memory storage devices 18(1)-18(n) within the cloud 20 which are then sent the platform management computing device 14 back to the corresponding requesting client computing devices 12(1)-12(n).

Referring more specifically to FIG. 1, the platform management computing device 14 interacts with the client computing devices 12(1)-12(n), the plurality of server computing devices 16(1)-16(n) and the plurality of memory storage devices 18(1)-18(n) through a communication network comprising LANs 28 and WAN 30, although the platform management computing device 14 may interact with other types and numbers of systems and devices through other types of communication networks with other network topologies.

Each of the client computing devices 12(1)-12(n) include a central processing unit (CPU) or processor, a memory, an interface device, and an I/O system, which are coupled together by a bus or other link, although other numbers and types of network devices could be used. In this example, each of the client computing devices 12(1)-12(n) includes one or more applications which provide an interface required to access the various applications on or more of the plurality of server computing devices 16(1)-16(n) and/or plurality of memory storage devices 18(1)-18(n) hosted within the cloud 20, although other manners for accessing can be used. By way of example only, the application on each of the client computing devices 12(1)-12(n) could be a web browser, although other types of applications and/or data may be present in each of the client computing devices 12(1)-12(n). In this example the client computing devices 12(1)-12(n) are personal computing devices, although other types and numbers of client computing devices, such as computing tablets and mobile devices by way of example only could be used.

Each of the plurality of server computing devices 16(1)-16(n) includes a central processing unit (CPU) or processor, a memory, an interface device, and an I/O system, which are coupled together by a bus or other link, although other numbers and types of network devices could be used. In this example, each of the plurality of server computing devices 16(1)-16(n) include applications and/or data required to process the request, although other types of programs and information may be present in each of the plurality of server computing devices 16(1)-16(n). The plurality of server computing devices 16(1)-16(n) are present in one geographical location, although one or more of the plurality of server computing devices 16(1)-16(n) could be in other geographical locations.

Each of the plurality of memory storage devices 18(1)-18(n) includes a central processing unit (CPU) or processor, a memory, an interface device, and an I/O system, which are coupled together by a bus or other link, although other numbers and types of network devices with other types and numbers of components could be used. Each of the plurality memory storage devices 18(1)-18(n) includes applications and/or data required to process the request, although other types of programs and information may be present in each of the plurality of memory storage devices 18(1)-18(n). The plurality memory storage devices 18(1)-18(n) also are present in one geographical location, although one or more of the plurality memory storage devices 18(1)-18(n) could be in other geographical locations.

The platform management computing device 14 manages providing development and deployment services as illustrated and described by way of way of the examples herein, although platform management computing device 14 may perform other types and numbers of functions and interact with other systems and devices. With reference to FIG. 2, the platform management computing device 14 includes at least one processor 32, memory 34, input and display devices 22, and interface device 38 which are coupled together by bus 40, although platform management computing device 14 may comprise other types and numbers of elements in other configurations.

The processor 32 in the platform management computing device 14 executes a program of stored instructions for one or more aspects of the present technology as described and illustrated by way of the examples herein, although other types and numbers of processing devices and logic could be used and the processor could execute other numbers and types of programmed instructions. The processor 32 may comprise one or more central processing units ("CPUs") or general purpose processors with one or more processing cores, such as AMD® processor(s), although other types of processor(s) could be used (e.g., Intel®).

Figure 3:
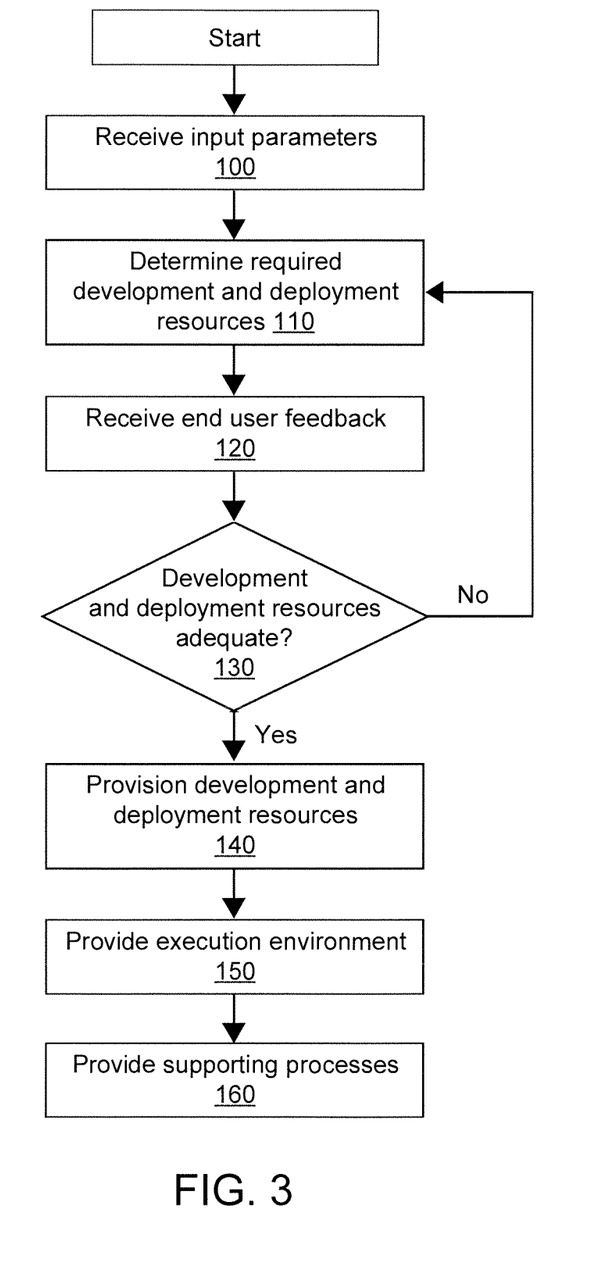
FIG. 3 is a flow chart of an exemplary method for providing end to end real-time computer program development and deployment platform.

The memory 34 in the platform management computing device 14 stores these programmed instructions for one or more aspects of the present technology as described and illustrated herein, such as the steps illustrated and described with reference to FIG. 3, although some or all of the programmed instructions could be stored and executed elsewhere. A variety of different types of memory storage devices, such as a random access memory (RAM) or a read only memory (ROM), flash memory, a floppy disk, hard disk, CD ROM, DVD ROM, solid state memory, or other non-transitory computer readable medium which is read from and written to by a magnetic, optical, or other reading and writing system that is coupled to the processor 32 in the platform management computing device 14, can be used for the memory 34.

Input and display devices 22 enable a user, such as an administrator, to interact with the platform management computing device 14, such as to input and/or view data and/or to configure, program and/or operate it by way of example only. Input devices may include a keyboard and/or a computer mouse and display devices may include a computer monitor, although other types and numbers of input devices and display devices could be used.

The interface device 38 in the platform management computing device 14 is used to operatively couple and communicate between the platform management computing device 14 and client computing devices 12(1)-12(n), the plurality of server computing devices 16(1)-16(n), and/or the plurality of memory storage devices 18(1)-18(n) which are all coupled together through one or more LAN 28 or WAN 30, although the interface device can be used to communicate with other types and numbers of systems, devices, components and elements. By way of example only, the interface device 38 can use TCP/IP over Ethernet and industry-standard protocols, including NFS, CIFS, SOAP, XML, LDAP, and SNMP, although other types and numbers of communication networks, can be used. In this example, the bus 40 is a hyper-transport bus in this example, although other bus types and links may be used, such as PCI.

Although an exemplary cloud computing environment 10 with the platform management computing device 14, the plurality of server computing devices 16(1)-16(n), the plurality of memory storage devices 18(1)-18(n) and the communication network comprising LANs 28 and WAN 30 are described and illustrated herein, other types and numbers of systems, devices in other topologies can be used. It is to be understood that the systems of the examples described herein are for exemplary purposes, as many variations of the specific hardware and software used to implement the examples are possible, as will be appreciated by those skilled in the relevant art(s).

Furthermore, each of the systems of the examples may be conveniently implemented using one or more general purpose computer systems, microprocessors, digital signal processors, and micro-controllers, programmed according to the teachings of the examples, as described and illustrated herein, and as will be appreciated by those of ordinary skill in the art.

The examples may also be embodied as a non-transitory computer readable medium having instructions stored thereon for one or more aspects of the technology as described and illustrated by way of the examples herein, which when executed by a processor (or configurable hardware), cause the processor to carry out the steps necessary to implement the methods of the examples, as described and illustrated herein.

An exemplary method for providing a real-time computer program development and deployment environment will now be described with reference to FIGS. 1-5. In step 100, the platform management computing device 14 receives a plurality of input parameters related to a development and deployment project, although the parameters can be obtained in other manners. By way of example, the input parameters may be received from one or more of the client computing devices 12(1)-12(n) through a web based application accessed through the web browser on the one or more client computing devices 12(1)-12(n) or may be input directly to the platform management computing device 14 by an administrator, or other user, via the input and display devices 22. Additionally, by way of example only the input parameters may include parameters related to the use cases, function points, nonfunctional requirements, scope of the project, project timelines, and/or the average number of human resources or team size required for the development and deployment project, although the input parameters may include other parameters related to the development and deployment project.

In step 110, the platform management computing device 14 determines a plurality of development and deployment resources for the development and deployment project based on the plurality of input parameters. The platform management computing device 14 may determine the necessary resources for development, deployment and maintenance of the computer program contemplated by the development and deployment project. The platform management computing device 14 may further determine the necessary resources for performance and integration testing of the contemplated computer program.

The development and deployment resources may include hardware and computer programs required for the development and deployment project, although the development and deployment resources may include any other number and type of resources needed for a development and deployment project. The development and deployment hardware may refer one or more of the server computing devices 16(1)-16(n), and one or more of the storage devices 18(1)-18(n) clustered within cloud 20, although the hardware may include other resources such as blades, switches, and routers. The one or more computer programs may provide development and deployment services such as requirements capture, architecture and design, code creation, code check in, code check out, compilation, execution, unit test creation, unit test execution, or performance profiling, although the one or more computer programs may provide other development and deployment services. The platform management computing device 14 may further determine the necessary sizing of the development and deployment resources. By way of example only, the platform management computing device 14 may determine the number of servers 16(1)-16(n), the processing requirements for the servers 16(1)-16(n), the number and capacity of storage devices 18(1)-18(n), the number of nodes for access to the platform by client computing devices 12(1)-12(n), and the particular computer programs required, although the platform management computing device 14 may determine the sizing of other development and deployment resources.

In step 120, the platform management computing device 14 may optionally receive feedback from the end user at one of the client computing devices 12(1)-12(n) related the development and deployment resources and sizing thereof, although other manners for receiving feedback, such as direct input into the environment management computing device 14 by an administrator, or other user, via the input and display devices 22 could be used.

In step 130, the platform management computing device 14 determines, based on the feedback received from the end user, whether the determined development and deployment resources and sizing are sufficient for the planned development and deployment project. If in step 130 the platform management computing device 14 determines based on the end user feedback that the development and deployment resources need further customization, then the No branch is taken to step 110. If the platform management computing device 14 determines the development and resources meet the requirements of the development and deployment project, then the Yes branch is taken to step 140.

In step 140, the platform management computing device 14 provisions the development and deployment resources. The platform management computing device 14 allocates the required development and deployment resources to the development and deployment project. The provisioned development and deployment resources may include the resources determined in step 110, as well as any additional resources required for the development and deployment project. As part of the provisioning in step 140, the platform management computing device 14 also acquires the necessary licenses for the use of the development and deployment resources, including the computer programs. The provisioned development and deployment resources may be adjusted based on user input. For example, the number of nodes for access to the platform by client computing devices 12(1)-12(n) may be increased or decreased based on development and deployment project requirements.

In step 150, the platform management computing device 14 provides an execution environment to utilize the provisioned development and deployment resources. The platform management computing device 14 provides an interface for a set of users to utilize the development and deployment resources, including the hardware and computer programs, which may be accessed through client computing devices 12(1)-12(n). The number of nodes may be determined based on the input parameters received in step 100. The execution environment provides an interface to the computer programs for all aspects of application development to be executed remotely on the requesting one of the client computing devices 12(1)-12(n). By way of example only, requirements capture, architecture and design, code creation, code check in and check out, compilation, execution, creating unit test, executing unit test, or performance profiling may be provided, although other aspects of computer program development may be provided. The execution environment also provides an interface to application hosting environments. The application hosting environments refer to one or more application hosting services, such as functional testing, stress testing, load testing, and deployment of the application created during the development and deployment project, although other types of application hosting services may be provided.

In step 160, the platform management computing device 14 further provides additional supporting processes for the development and deployment of the computer program project. By way of example only, the project management computing device 14 may provide project management processes, quality processes, and people management processes, to support the development and deployment of the computer program. Project management processes may, for example, allow for tracking the progress of the project, costs, or billing, although other types of elements could be tracked. By way of example only, the data related to the project management processes may appear as a dashboard at one or more the plurality of client computing devices 12(1)-12(n). The quality processes may, for example, ensure compliance with CMM, such as CMM 1 to 5, or ISO standards, such as ISO9001, for the development and deployment project. The people processes may, for example, provide a framework for managing the individual users working on the computer program development project, such as PCMM by way of example only.

Figure 4:
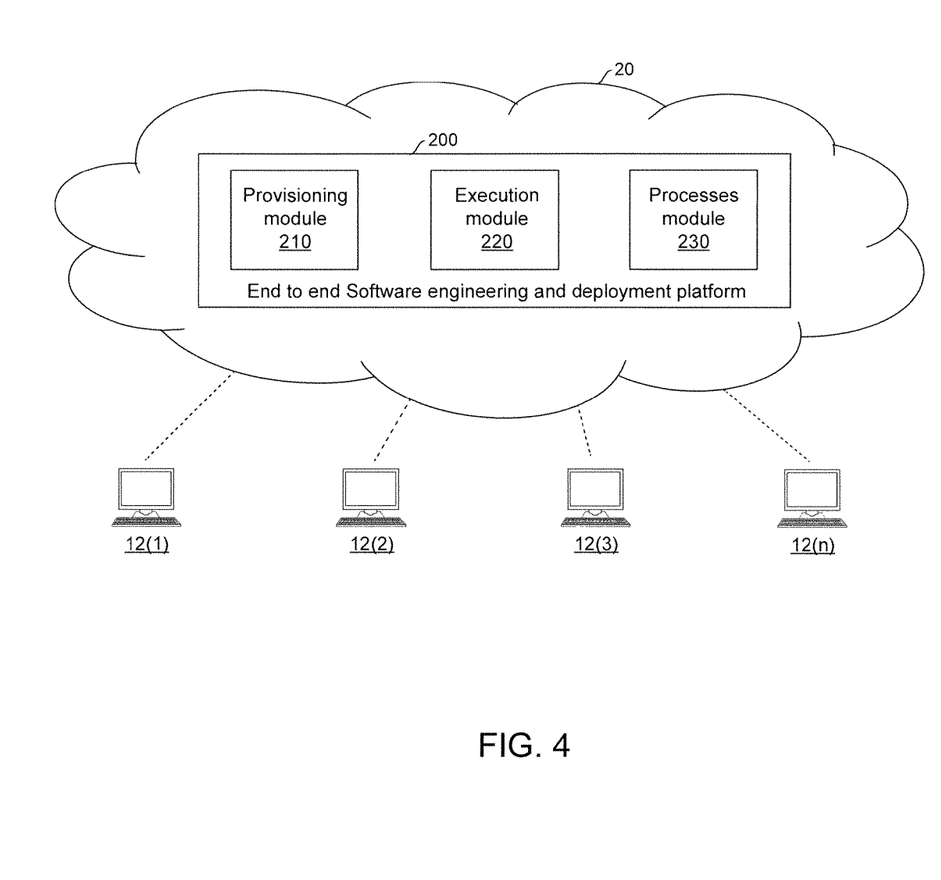
FIG. 4 is a diagram of an exemplary end to end real-time computer program development and deployment platform.
Figure 5:
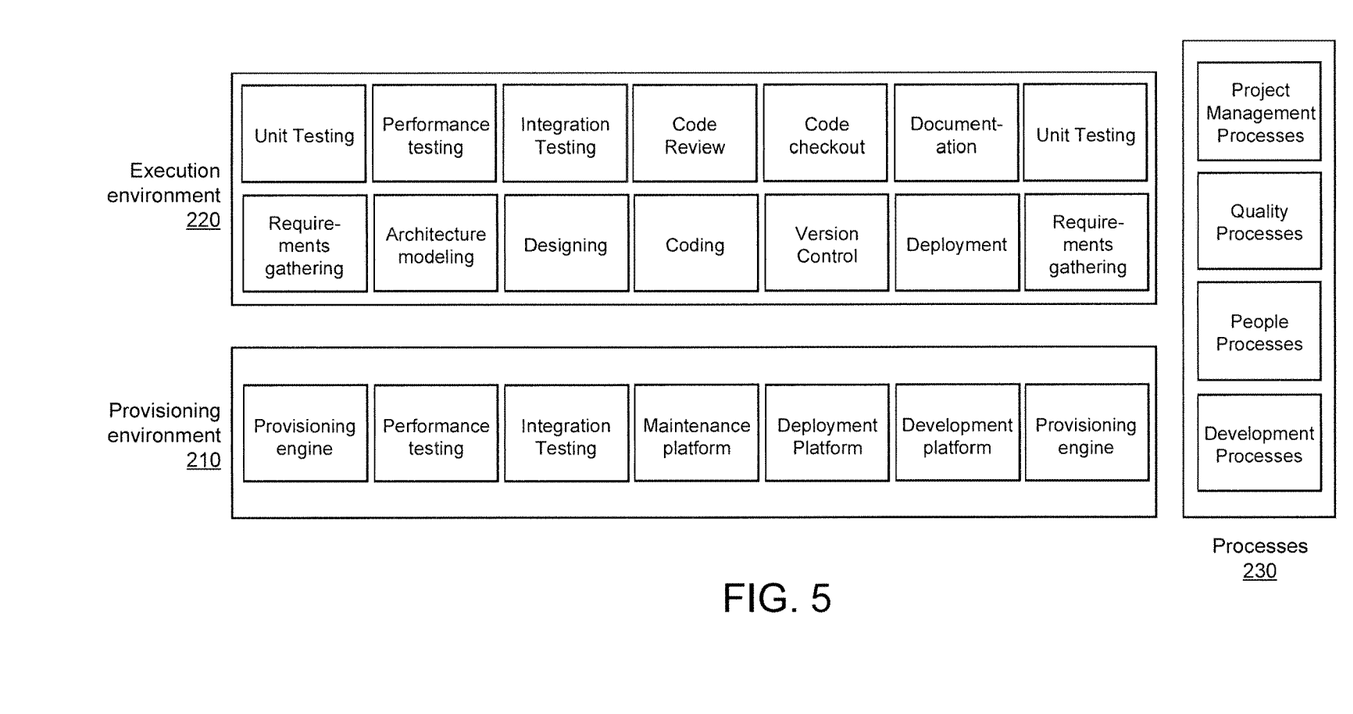
FIG. 5 is a block diagram of the exemplary modules in the end to end real-time computer program development and deployment platform.

Referring to FIG. 4, an exemplary diagram of end to end computer program development and deployment platform 200 for providing development and deployment services is illustrated. The platform 200 is located on cloud 20 and is accessible remotely by client computing devices 12(1)-12(n). The platform 200 includes a provisioning module 210, an execution module 220, and a processes module 230 for providing the services of the present invention. The provisioning module 210 allows for automatic provision of the required development and deployment resources base on input parameters related to a development and deployment project entered remotely using a web based application located on one or more of client computing devices 12(1)-12(n). The execution module 220 provides the execution environment for utilization of the development and deployment resources and completing the development and deployment activities required for the computer program project. The processes module 230 provides additional processes that may support the planning, development, maintenance, and deployment of the computer program project. Referring to FIG. 5, a block diagram of the exemplary modules including the services provided by each of the modules is illustrated.

This exemplary technology provides an effective method, non-transitory computer readable medium and apparatus for providing a computer program development and deployment environment. This exemplary method provides an environment that allows for real-time, off-premise, development and deployment of a computer program, which allows for development to occur anytime and anywhere using dumb terminals and reduces the traditional capital investment costs associated with a computer program development and deployment project.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method for providing development and deployment services in a platform, the method comprising:

receiving by a platform management computing device a plurality of input parameters related to a development and deployment project via a web based application, wherein the development and deployment project comprises development and deployment of a computer program;

determining by the platform management computing device a plurality of development and deployment resources for the development and deployment project based on the received plurality of input parameters;

adjusting by the platform management computing device both the determined plurality of development and deployment resources and a sizing of the determined plurality of development and deployment resources based on a user input until the determined plurality of development and deployment resources meet a set of requirements for the development and deployment project prior to provisioning the resources;

provisioning by the platform management computing device the determined plurality of development and deployment resources;

providing by the platform management computing device an execution environment that provides an interface for utilization of the provisioned plurality of development and deployment resources for development and deployment of the computer program, wherein the provided execution environment comprises one or more application hosting services; and providing by the platform management computing device a plurality of supporting processes to support the utilization of the provided execution environment.

2. The method of claim 1 wherein the platform is a cloud-based platform.

3. The method of claim 1 wherein the input parameters comprise a use case parameter, a function point parameter, a nonfunctional requirement parameter, a scope parameter, a team size parameter, and a timeline parameter for the development and deployment project.

4. The method of claim 1 wherein the plurality of development and deployment resources comprise a computer program.

5. The method of claim 4 wherein the computer program provides development and deployment services comprising one or more of requirements capture, architecture and design, code creation, code check in, code check out, compilation, execution, creating unit test, executing unit test, or performance profiling.

6. The method of claim 1 wherein the processes for supporting the development and deployment project comprise one or more of a development and deployment project management processes for tracking completion of the development and deployment project, a quality assessment processes for monitoring compliance to one or more quality standards, and a people management processes for managing performance of the development and deployment project.

7. The method of claim 6 wherein the one or more quality standards comprise one or more of ISO or Capability Maturity Model standards.

8. The method of claim 1 wherein the execution environment provides the interface for utilizing the development and deployment resources remotely by a client computing device and further wherein the execution environment provides one or more application hosting services wherein the application hosting services comprise one or more of functional testing, stress testing, load testing, and deployment.

9. A non-transitory computer readable medium having stored thereon instructions for providing development and deployment services in a platform comprising machine executable code which when executed by at least one processor causes the processor to perform steps comprising:
receiving a plurality of input parameters related to a development and deployment project via a web based application, wherein the development and deployment project comprises development and deployment of a computer program;
determining a plurality of development and deployment resources for the development and deployment project based on the received plurality of input parameters;
adjusting both the determined plurality of development and deployment resources and a sizing of the determined plurality of development and deployment resources based on a user input until the determined plurality of development and deployment resources meet a set of requirements for the development and deployment project prior to provisioning the resources;
provisioning the determined plurality of development and deployment resources from a single cloud-based platform;
providing an execution environment that provides an interface for utilization of the provisioned plurality of development and deployment resources for the development and deployment of the computer program, wherein the provided execution environment comprises one or more application hosting services; and
providing a plurality of supporting processes to support the utilization of the provided execution environment.

10. The medium of claim 9 wherein the platform is a cloud-based platform.

11. The medium of claim 10 wherein the processes for supporting the development and deployment project comprise one or more of a development and deployment project management processes for tracking completion of the development and deployment project, a quality assessment processes for monitoring compliance to one or more quality standards, or a people management processes for managing performance of the development and deployment project.

12. The medium of claim 11 wherein the one or more quality standards comprise one or more of ISO or Capability Maturity Model standards.

13. The medium of claim 9 wherein the input parameters comprise a use case parameter, a function point parameter, a nonfunctional requirement parameter, a scope parameter, a team size parameter, and a timeline parameter for the development and deployment project.

14. The medium of claim 9 wherein the plurality of development and deployment resources comprise a computer program.

15. The medium of claim 14 wherein the computer program provides development and deployment services comprising one or more of requirements capture, architecture and design, code creation, code check in, code check out, compilation, execution, creating unit test, executing unit test, or performance profiling.

16. The medium of claim 9 wherein the execution environment provides the interface for utilizing the development and deployment resources remotely by a client computing device and further wherein the execution environment provides one or more application hosting services wherein the application hosting services comprise one or more of functional testing, stress testing, load testing, and deployment.

17. A platform management computing device comprising:
one or more processors;
a memory, wherein the memory is coupled to the one or more processors which are configured to execute programmed instructions stored in the memory comprising:
receiving a plurality of input parameters related to a development and deployment project via a web based application, wherein the development and deployment project comprises development and deployment of a computer program;
determining a plurality of development and deployment resources for the development and deployment project based on the received plurality of input parameters;
adjusting both the determined plurality of development and deployment resources and a sizing of the determined plurality of development and deployment resources based on a user input until the determined plurality of development and deployment resources meet a set of requirements for the development and deployment project prior to provisioning the resources;
provisioning the determined plurality of development and deployment resources from a single cloud-based platform;

providing an execution environment that provides an interface for utilization of the provisioned plurality of development and deployment resources for the development and deployment of the computer program, wherein the provided execution environment comprises one or more application hosting services; and providing a plurality of supporting processes to support the utilization of the provided execution environment.

18. The device of claim 17 wherein the platform is a cloud-based platform.

19. The device of claim 17 wherein the input parameters comprise a use case parameter, a function point parameter, a nonfunctional requirement parameter, a scope parameter, a team size parameter, and a timeline parameter for the development and deployment project.

20. The device of claim 17 wherein the plurality of development and deployment resources comprise a computer program.

21. The device of claim 20 wherein the computer program provides development and deployment services comprising one or more of requirements capture, architecture and design, code creation, code check in, code check out, compilation, execution, creating unit test, executing unit test, or performance profiling.

22. The device of claim 17 wherein the processes for supporting the development and deployment project comprise one or more of a development and deployment project management processes for tracking completion of the development and deployment project, a quality assessment processes for monitoring compliance to one or more quality standards, or a people management processes for managing performance of the development and deployment project.

23. The device of claim 22 wherein the one or more quality standards comprise one or more of ISO or Capability Maturity Model standards.

24. The device of claim 17 wherein the execution environment provides the interface for utilizing the development and deployment resources remotely by a client computing device and further wherein the execution environment provides one or more application hosting services wherein the application hosting services comprise one or more of functional testing, stress testing, load testing, and deployment.

* * * * *